United States Patent
Li et al.

(10) Patent No.: US 8,204,389 B2
(45) Date of Patent: Jun. 19, 2012

(54) ELECTRONIC POST-COMPENSATION OF OPTICAL TRANSMISSION IMPAIRMENTS USING DIGITAL BACKWARD PROPAGATION

(75) Inventors: Guifang Li, Oviedo, FL (US); Eduardo Mateo, Orlando, FL (US); Likai Zhu, Orlando, FL (US); Xiaoxu Li, Orlando, FL (US); Gilad Goldfarb, Sunnyvale, CA (US); Xin Chen, Beijing (CN); Inwoong Kim, Allen, TX (US); Fatih Yaman, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 640 days.

(21) Appl. No.: 12/351,444

(22) Filed: Jan. 9, 2009

(65) Prior Publication Data

US 2009/0214215 A1 Aug. 27, 2009

Related U.S. Application Data

(60) Provisional application No. 61/031,852, filed on Feb. 27, 2008, provisional application No. 61/097,731, filed on Sep. 17, 2008.

(51) Int. Cl.
*H04B 10/06* (2006.01)

(52) U.S. Cl. .......... 398/208; 398/209; 398/202; 398/81; 398/45

(58) Field of Classification Search .................. 398/208, 398/209, 202, 81, 45
See application file for complete search history.

(56) References Cited

U.S. PATENT DOCUMENTS

| | | | |
|---|---|---|---|
| 6,498,669 B1* | 12/2002 | Payne et al. | 398/147 |
| 2007/0031155 A1* | 2/2007 | Minzioni et al. | 398/147 |
| 2008/0163025 A1* | 7/2008 | Djordjevic et al. | 714/755 |
| 2009/0214215 A1* | 8/2009 | Li et al. | 398/81 |
| 2010/0142951 A1* | 6/2010 | Armstrong et al. | 398/65 |
| 2010/0165348 A1* | 7/2010 | Fleischer et al. | 356/458 |

* cited by examiner

*Primary Examiner* — Kinam Park (74) *Attorney, Agent, or Firm* — Thomas, Kayden, Horstemeyer & Risley, LLP (57) ABSTRACT

Systems and method of compensating for transmission impairment are disclosed. One such method comprises: receiving an optical signal which has been distorted in the physical domain by an optical transmission channel; and propagating the distorted optical signal backward in the electronic domain in a corresponding virtual optical transmission channel.

25 Claims, 11 Drawing Sheets

ELECTRONIC POST-COMPENSATION OF OPTICAL TRANSMISSION IMPAIRMENTS USING DIGITAL BACKWARD PROPAGATION

CROSS-REFERENCE TO RELATED APPLICATIONS

This application claims priority to U.S. Provisional Application having Ser. No. 61/031,852 filed Feb. 27, 2008, and claims priority to U.S. Provisional Application having Ser. No. 61/097,731 filed Sep. 17, 2008, each of which is hereby incorporated by reference herein in its entirety.

FIELD OF THE DISCLOSURE

The present disclosure relates to compensating for optical transmission impairments in the electronic or software domain.

BACKGROUND

Channel impairments in transmission systems result in signal degradation and thus limit the carrying capacity of these systems. In optical transmission systems, some of these impairments are linear (e.g., fiber chromatic dispersion or CD) and some are non-linear (e.g., cross-phase modulation and four-wave mixing caused by the Kerr effect). To minimize the effect of impairments, transmission systems may include various types of compensation systems or devices. A signal can be modified before, or as part of, transmission to account for the effect of impairment (a technique known as pre-compensation). Conversely, knowledge about an impairment can be used to modify a received signal to compensate for the impairment (a technique known as post-compensation). Such compensation systems or devices can be implemented in the optical domain or in the electrical/electronic domain.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

The inventive techniques described herein compensate for optical distortion, using backward propagation in the electrical domain. Specifically, the receiver uses digital backward propagation to convert the received optical signal into an estimate of the transmitted signal.

Figure 1:
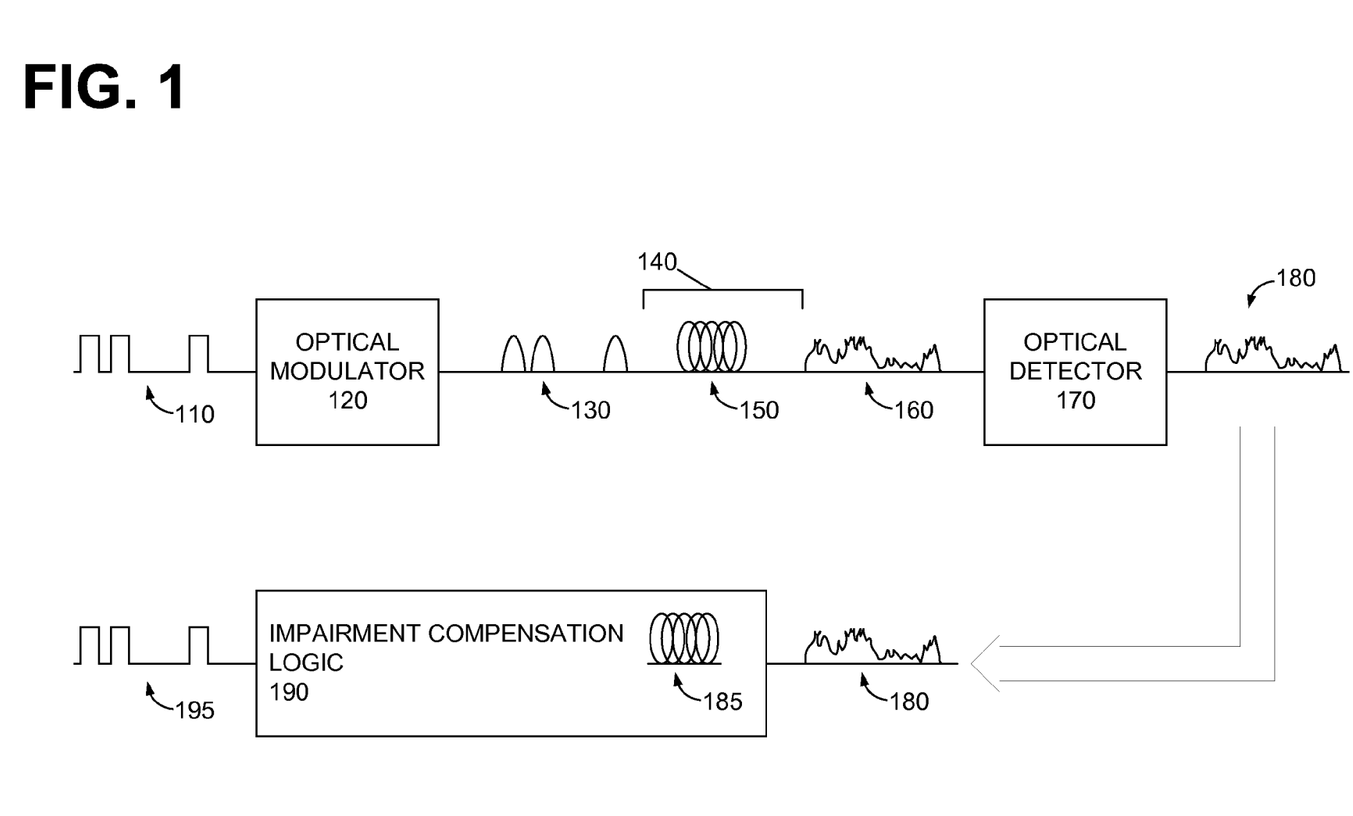
FIG. 1 is a system model diagram of an optical communication system including an embodiment of impairment compensation logic.

FIG. 1 is a system model diagram of an optical communication system including an embodiment of impairment compensation logic. Transmitted data is carried by an electrical signal 110, which is provided to an optical modulator 120. Optical modulator 120 produces a (modulated) optical signal 130. Although FIG. 1 depicts only a single modulator, it should be appreciated that the principles described herein can be extended to various multiplexing schemes, such as wavelength-division multiplexing and/or polarization-division multiplexing.

Optical signal 130 travels through an optical channel 140, which includes optical fiber 150. Optical fiber 150 introduces various types of distortion, resulting in a distorted optical signal 160. Distorted optical signal 160 is provided to an optical detector 170, which converts the distorted optical signal to a signal in the electrical domain. Distorted electrical signal 180 is processed in the electrical (digital) domain by impairment compensation logic 190 to remove the distortion produced in the optical (physical) domain. Impairment compensation logic 190 operates by modeling the characteristics of optical fiber 150 in a virtual optical fiber 185. The output of impairment compensation logic 190 is a compensated electrical signal 195. Carried within compensated electrical signal 195 is data which is a replica (or near replica) of the originally transmitted data.

The model embodied in impairment compensation logic 190 accounts for, and reverses the effect of, various impairments introduced by optical fiber 150. As will be discussed below, different types of impairments, or combinations thereof, can be accounted for by using different models. For example, one model discussed herein compensates for fiber dispersion, intra-channel impairments (e.g., self-phase modulation or SPM), and inter-channel impairments (e.g., cross-phase modulation and four-wave mixing). This model is referred to herein as "total" or "universal" compensation. Another model discussed herein compensates for fiber dispersion, intra-channel impairments, and cross-phase modulation (XPM) while ignoring four-wave mixing (FWM). Yet another model is contemplated which fully compensates for fiber dispersion, intra-channel impairments, and cross-phase modulation, while partially compensating for four-wave mixing. These two models are referred herein as "selective non-linear" compensation.

Figure 2:
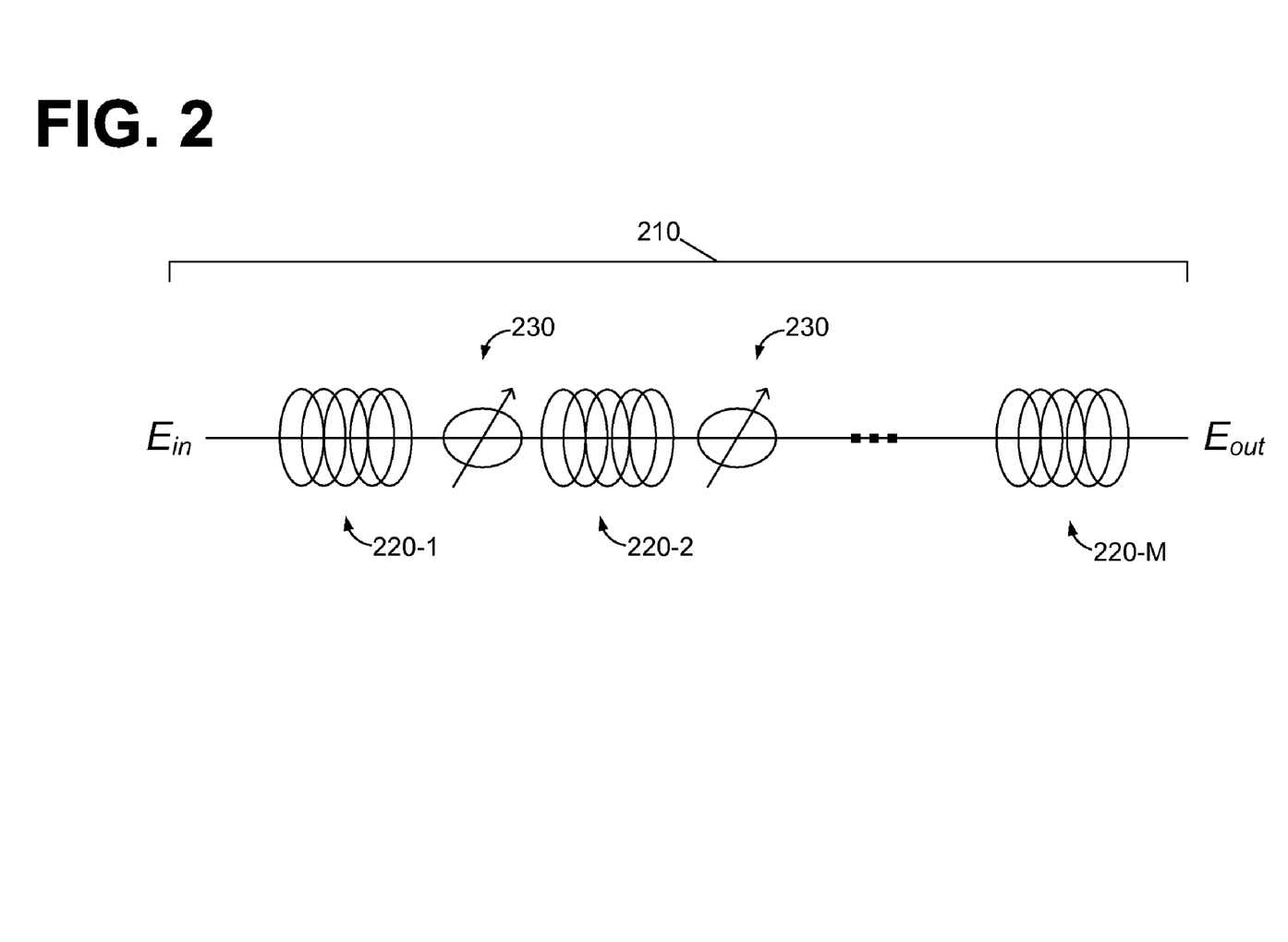
FIG. 2 is a system model diagram of one embodiment of a virtual fiber model implemented in the electrical domain.

FIG. 2 is a system model diagram of one embodiment of a virtual fiber model. $E_{in}$ is the electric field of the received distorted electrical signal (180 in FIG. 1). $E_{out}$ is the electric field of the compensated electrical signal (195 in FIG. 1). Virtual fiber link 210 includes multiple spans 220 (220-1, 220-2 . . . 220-M), divided by attenuators 230. (It should be appreciated that attenuators 230 compensate for optical amplifiers deployed between fiber spans). The model compensates for physical fiber distortion by performing backward propagation on each span 220. Backward propagation in a span 220 is governed by a z-reversed nonlinear Schrödinger equation (NLSE).

The NLSE includes parameters which correspond to the characteristics of the physical optical fiber (150 in FIG. 1): absorption (loss) coefficient; first-order chromatic dispersion; second-order chromatic dispersion; and non-linear coefficient. By using backward propagation with parameter values that are the negative (opposite) of the physical fiber parameters, the virtual fiber model compensates for signal impairments introduced by these physical fiber characteristics. Variations on the basic model of FIG. 2 use different forms of the NLSE to compensate for different types of fiber impairments. Two such variations will now be discussed.

The total or universal compensation model takes into account the total electrical field to compensate for all forms of fiber impairment: dispersion (second and third order); self-phase modulation; cross-phase modulation; and four-wave mixing. This model solves a form of NLSE known as total NLSE (T-NSLE) which governs the backward propagation of the total electrical field. Backward T-NLSE can be written as $$\frac{\partial E}{\partial z} + \frac{a}{2}E + \frac{i\beta_2}{2}\frac{\partial^2 E}{\partial t^2} - \frac{\beta_3}{6}\frac{\partial^3 E}{\partial t^3} - i\gamma|E|^2 E = 0 \quad \text{(Eq. 1)}$$

where, $\gamma$ is the nonlinear parameter, $\beta_j$ represents the jth-order chromatic dispersion parameter, $\alpha$ is the absorption coefficient, and t is the retarded time. Other impairments including scattering (Raman, Rayleigh and Brillouin scattering) can also be included in the T-NLSE. Likewise, polarization impairments such as nonlinear polarization rotation can be included. Here, two coupled-NLSE equations are used to describe backward propagation. Polarization-related distortions can be corrected using a z-reversed two coupled-NLSE equations provided that signal state of polarization is monitored in some points of the transmission link.

The total compensation model discussed above accounts for intra-channel non-linear impairments, inter-channel non-linear impairments, and linear transmission impairments related to dispersion. Selective non-linear compensation accounts for particular types of non-linear impairments, while ignoring other types of non-linear impairments. The effects of four-wave-mixing (FWM) can be omitted by simplifying the total NLSE described above to produce a system of coupled equations referred to herein as "coupled NLSE" (C-NLSE). The following techniques are used to derive C-NLSE from T-NLSE.

First, the full optical field can be expressed as $E=\Sigma \hat{E}_m \exp(im\Delta\omega t)$, where $\hat{E}_m$ is the mth WDM channel envelope and $\Delta\omega$ is the inter-channel frequency spacing. Next, the expression for E is introduced into Eq. 1, the $|E|^2$ term is expanded, and the terms related to FWM are neglected. The result is the set of coupled equations (C-NLSE):

$$-\frac{\partial \hat{E}_m}{\partial Z} + \frac{\alpha}{2}\hat{E}_m + K_{1m}\frac{\partial \hat{E}_m}{\partial t} + K_{2m}\frac{\partial^2 \hat{E}_m}{\partial t^2} + \quad \text{(Eq. 2)}$$

$$K_{3m}\frac{\partial^3 \hat{E}_m}{\partial t^3} - i\gamma\left(2\sum_m^N |\hat{E}_m|^2 - |\hat{E}_m|^2\right)\hat{E}_m = 0$$

where, $K_{1m}=\beta_2 m^2\Delta\omega - \beta_3 m^2\Delta\omega^2/2$, $K_{2m}=\beta_2/2+\beta_3 m\Delta\omega/2$, $K_{3m}=-\beta_3/6$. C-NLSE (Eq. 2) describes the backward propagation of fiber channels where only dispersion, self-phase modulation and cross-phase modulation are compensated (i.e., FWM is not compensated for).

In yet another model, the NLSE can be generalized to describe spatial and temporal evolution of images using the paraxial (3D+1)-NLSE below:

$$-\frac{\partial E}{\partial z} + i\frac{1}{2k}\left(\frac{\partial}{\partial x^2} + \frac{\partial}{\partial y^2}\right)E + \quad \text{(Eq. 3)}$$

$$\frac{\alpha}{2}E + \frac{i\beta_2}{2}\frac{\partial^2 E}{\partial t^2} - \frac{\beta_3}{6}\frac{\partial^3 E}{\partial t^3} - i\gamma|E|^2 E = 0,$$

where k is the propagation constant.

The model described above for the time-domain signals can be used to reverse distortions for static images in which case $\partial/\partial t=0$, and $$-\frac{\partial E}{\partial z} + i\frac{1}{2k}\left(\frac{\partial}{\partial x^2} + \frac{\partial}{\partial y^2}\right) + \frac{\alpha}{2}E - i\gamma|E|^2 E = 0. \quad \text{(Eq. 4)}$$

In so doing, the effects of nonlinearity and diffraction described by the $-i\gamma|E|^2 E$ and $$-i\frac{1}{2k}\left(\frac{\partial}{\partial x^2} + \frac{\partial}{\partial y^2}\right)E$$

terms can be compensated.

Furthermore, Eq. 3 can also be solved using the split-step method so that the effects of dispersion, diffraction and non-linearity can be compensated for transmission of time-varying images (e.g., videos) in dispersive media.

Some embodiments of the virtual fiber model solve the NLSE using the split-step Fourier method (SSFM). The steps themselves are specific to the equation being solved, and will be discussed in more detail later. The dispersive and nonlinear contributions to impairment are considered to be independent within a relatively short segment propagation. The backward propagation process is therefore broken into a series of iterations or steps, one for each segment within a span.

Figure 3:
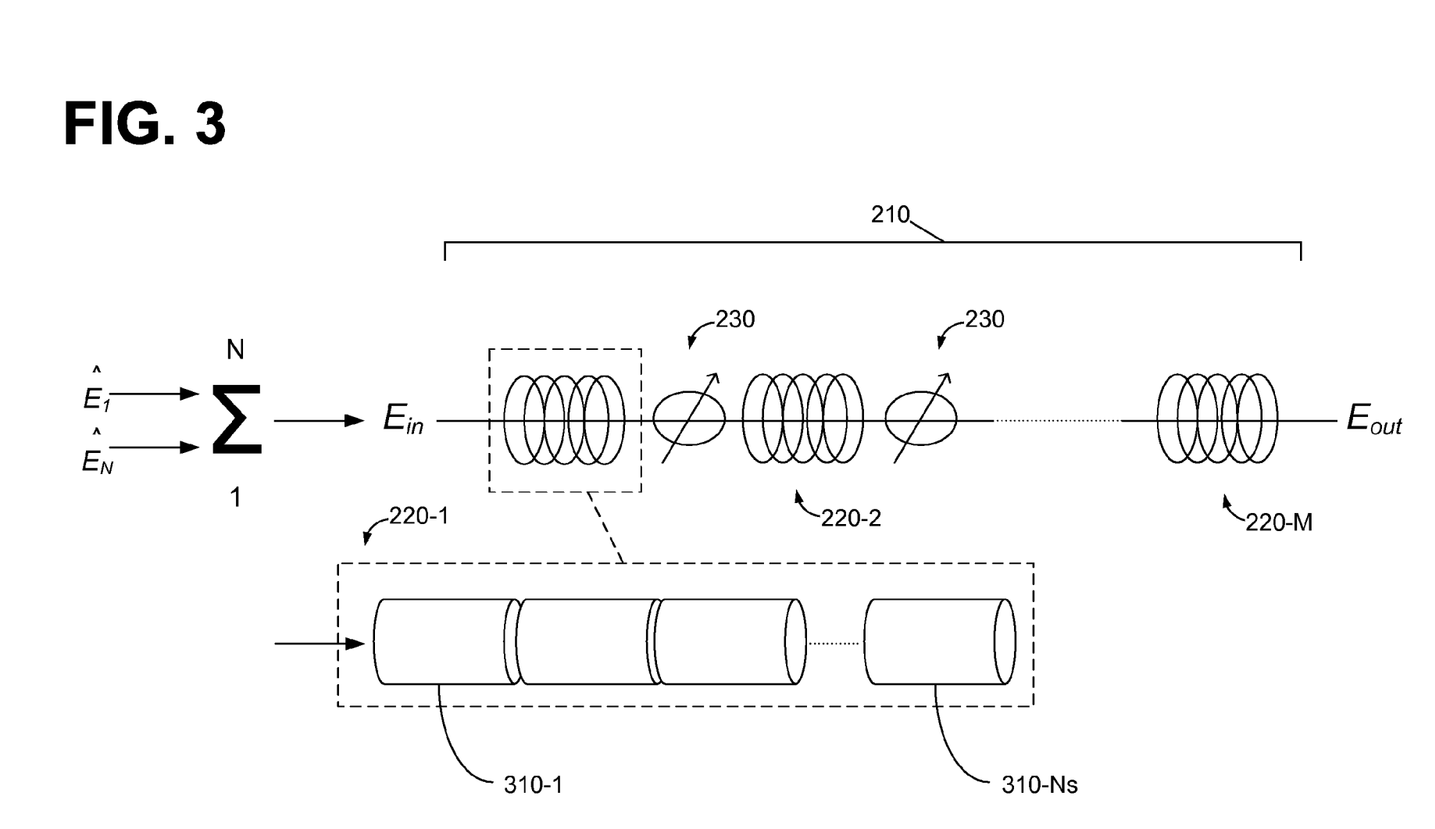
FIG. 3 is a block diagram of the split-step Fourier method as applied to one embodiment of a T-NLSE virtual fiber model.

FIG. 3 is a block diagram of SSFM as applied to one embodiment of a T-NLSE virtual fiber model. Virtual fiber link 210 includes M spans (220-1 . . . 220-M). Each span is treated as a series of iterations or steps 310-1 . . . 320-Ns. As mentioned above, T-NLSE uses the total electrical field and takes into account all impairments. Therefore, even though the electric field of the received distorted electrical signal ($E_{in}$ or element 180 in FIG. 1) actually includes N components (one for each wavelength), the components do not need to be considered individually. Thus, a summation operator 320 is used to combine the N electrical signals into a single $E_{in}$ input provided to each step 320. Some embodiment of virtual fiber link 210 also include virtual attenuators, in which case the virtual attenuator is modeled with an attenuation parameter that balances the gain of the corresponding optical amplifier in the physical fiber link.

Figure 4:
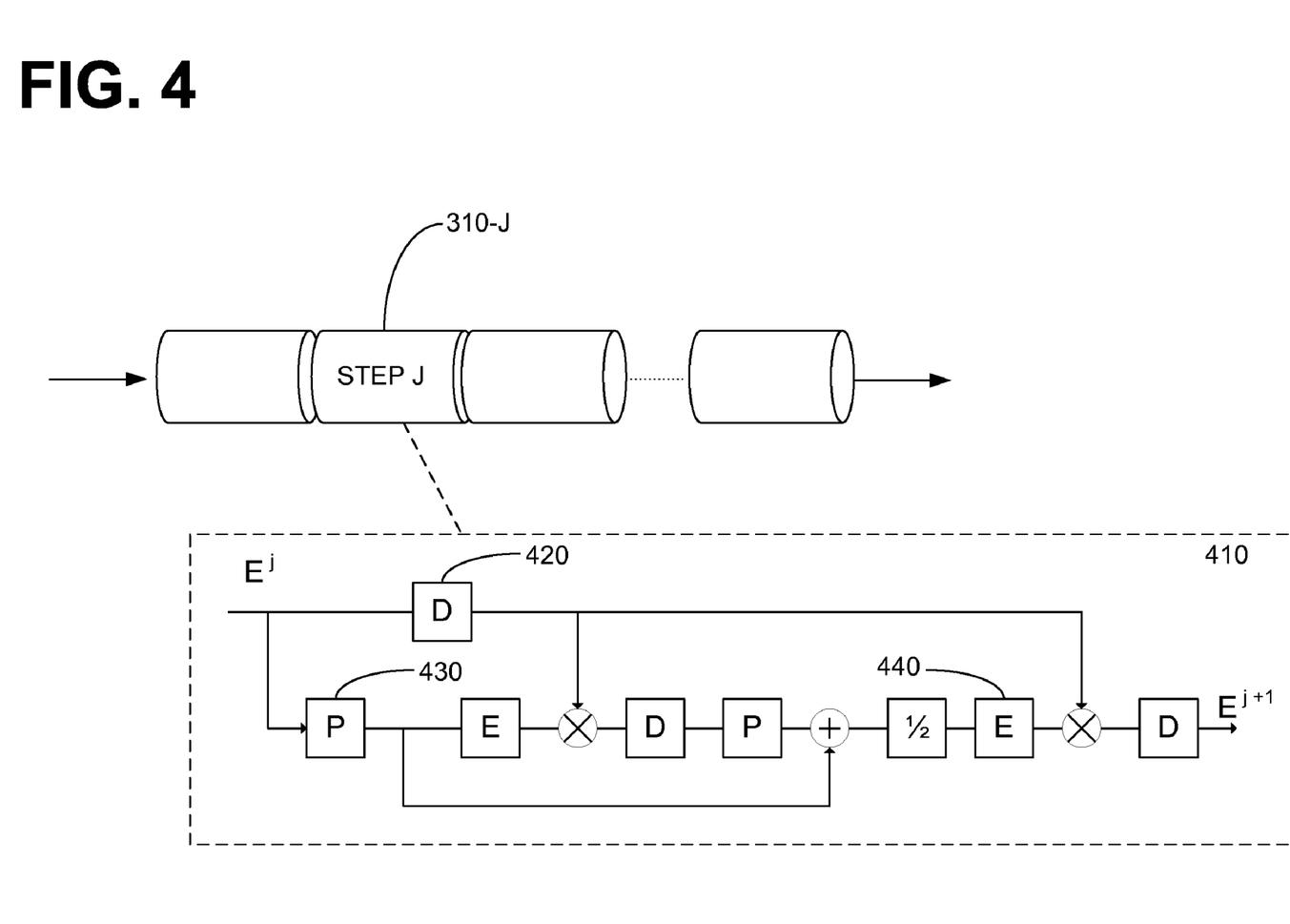
FIG. 4 is a block diagram of a module which implements a single step from the split-step Fourier method in one embodiment of a T-NLSE model.

FIG. 4 is a block diagram of a module which implements a single step 310 in one embodiment of a T-NLSE model (Eq. 1). The module can be implemented in software (instructions executing on a digital signal processor or other processor), in hardware logic (e.g., FPGA, ASIC, etc.), or in a combination of hardware and software. T-NLSE step module 410 uses three different types of operators, coupled as shown in FIG. 4: dispersion operator 420; power operator 430; and exponential operator 440.

Figure 9:
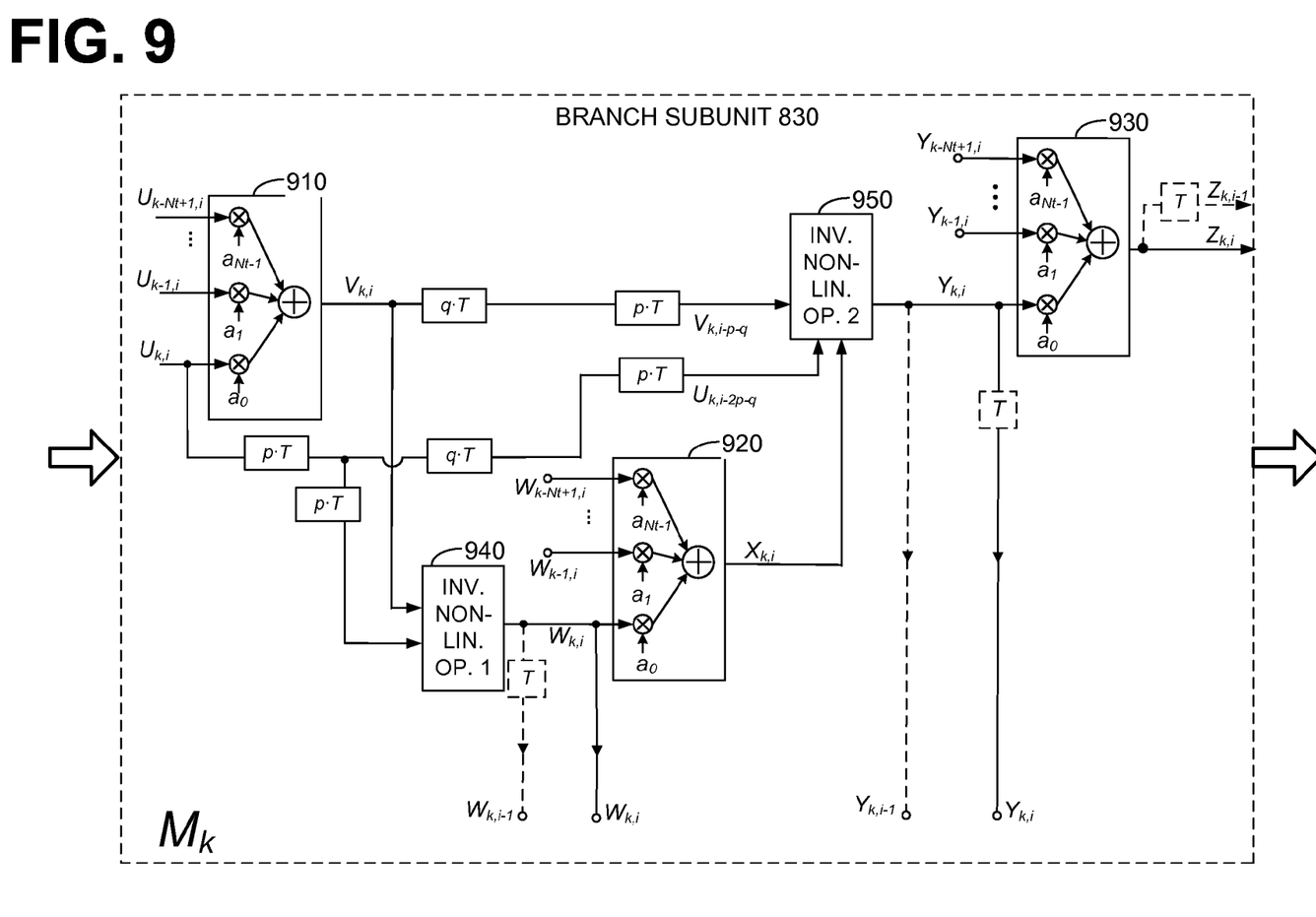
FIG. 9 is a block diagram of one embodiment of the branch sub-unit from FIG. 8.

The dispersion, power, and exponential operators are given by $D(x)=\phi^{-1}[H\phi(x)]$, $P(x)=|x|^2$, and $E(x)=\exp(i\gamma xh)$ where h is the step size. The transfer function H for fiber dispersion and absorption is given by $$H(\omega) = \exp\left[\left(\frac{\alpha}{2} + i\beta_2\frac{\omega^2}{2} + i\beta_3\frac{\omega^3}{6}\right)\frac{h}{2}\right]$$

with ω being the angular frequency. It should be appreciated that dispersion operator 420 can be implemented in various ways, in either the frequency domain or the time domain (e.g., finite impulse response (FIR) filter, infinite impulse response (IIR) filter). This example performs two iterations (sub-steps) for the power averaging, but other numbers of sub-steps are also contemplated. Details of the split-step algorithm are shown in the block diagram of branch sub-unit 830 in FIG. 9, where a parallel implementation of the split-step FIR method is depicted.

Figure 5:
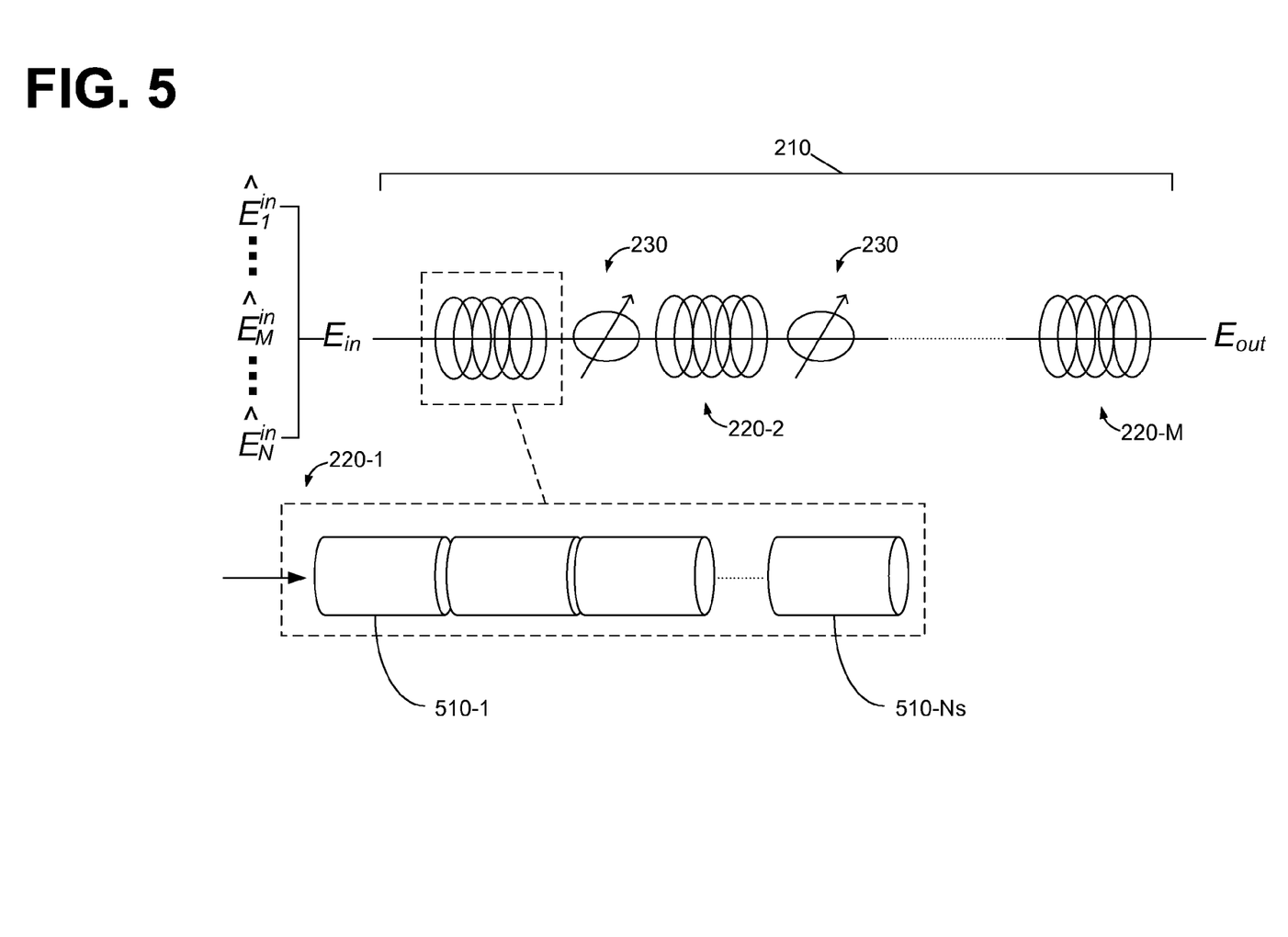
FIG. 5 is a block diagram of the split-step Fourier method as applied to one embodiment of a C-NLSE virtual fiber model.

FIG. 5 is a block diagram of SSFM as applied to one embodiment of a C-NLSE virtual fiber model. Virtual fiber link 210 includes M spans (220-1 . . . 220-M). Each span is treated as a series of iterations or steps-1 . . . 510-Ns. In contrast to the T-NLSE, C-NLSE does not use a summation operator to combine the individual channel (e.g., wavelength) components. Instead, multiple electrical signals (1 . . . N, one for each channel) are provided as inputs to each step 510.

Figure 6:
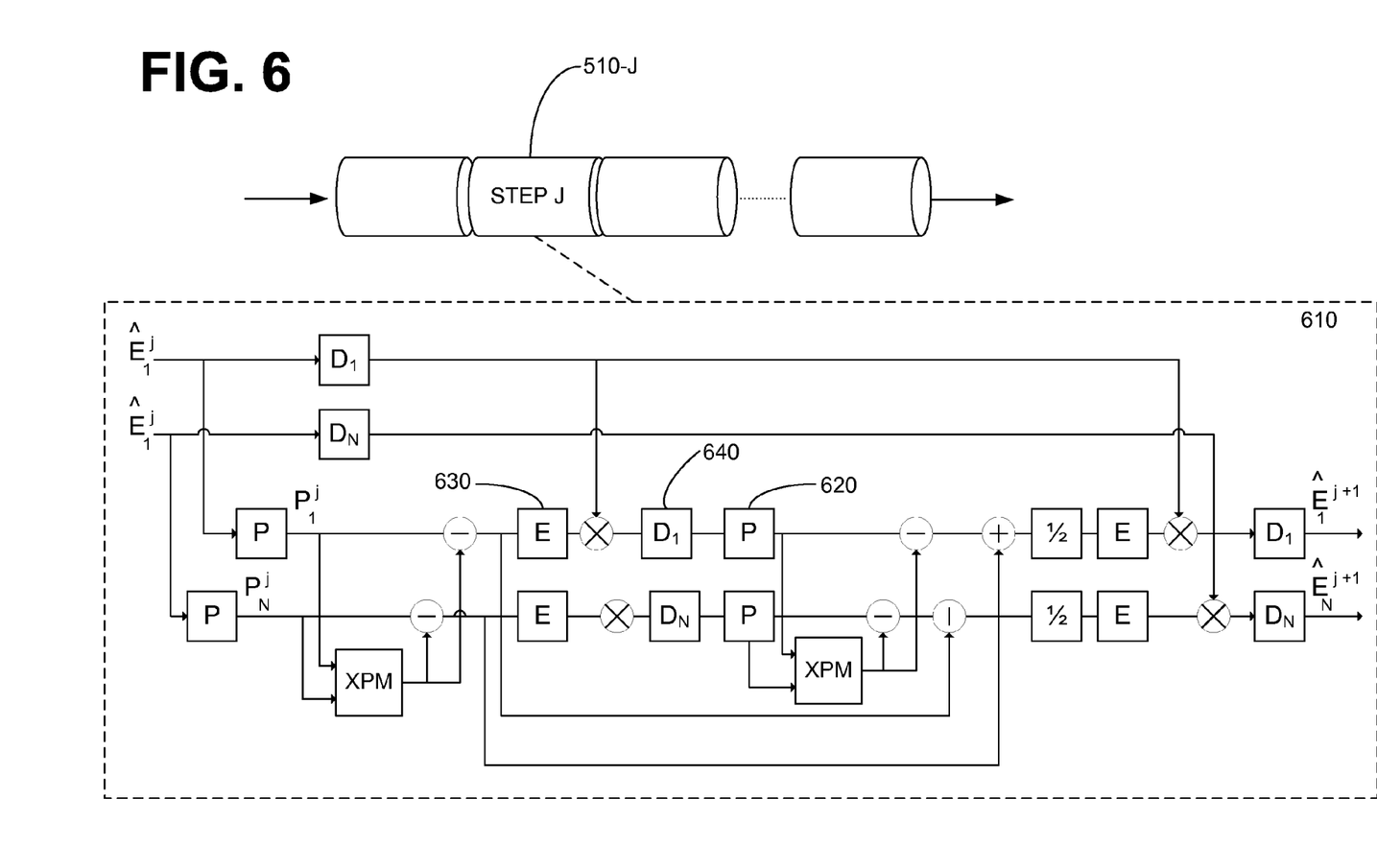
FIG. 6 is a block diagram of a module which implements a single step from the split-step Fourier method in one embodiment of a C-NLSE model.

FIG. 6 is a block diagram of a module which implements a single step in one embodiment of a C-NLSE model (Eq. 2). The module can be implemented in software (instructions executing on a digital signal processor or other processor), in hardware logic (e.g., FPGA, ASIC, etc.), or in a combination of hardware and software. In contrast to T-NLSE step module 410, C-NLSE step module 610 uses a sum operation at each sub-step in order to include the XPM contribution on each channel. Power operator 620 and exponential operator 630 are the same as in the T-NLSE step module described above. However, dispersion operator 640 is given by $D_m(x)=\phi^{-1}[H_m\phi(x)]$, where $\phi(x)$ represents the Fourier Transform of x. The transfer function for fiber dispersion and loss is $$H_m(\omega) = \exp\left[\left(\frac{\alpha}{2} + i\beta_2\frac{(\omega - m\Delta\omega)^2}{2} + i\beta_3\frac{(\omega - m\Delta\omega)^3}{6}\right)\frac{h}{2}\right].$$

Figure 7:
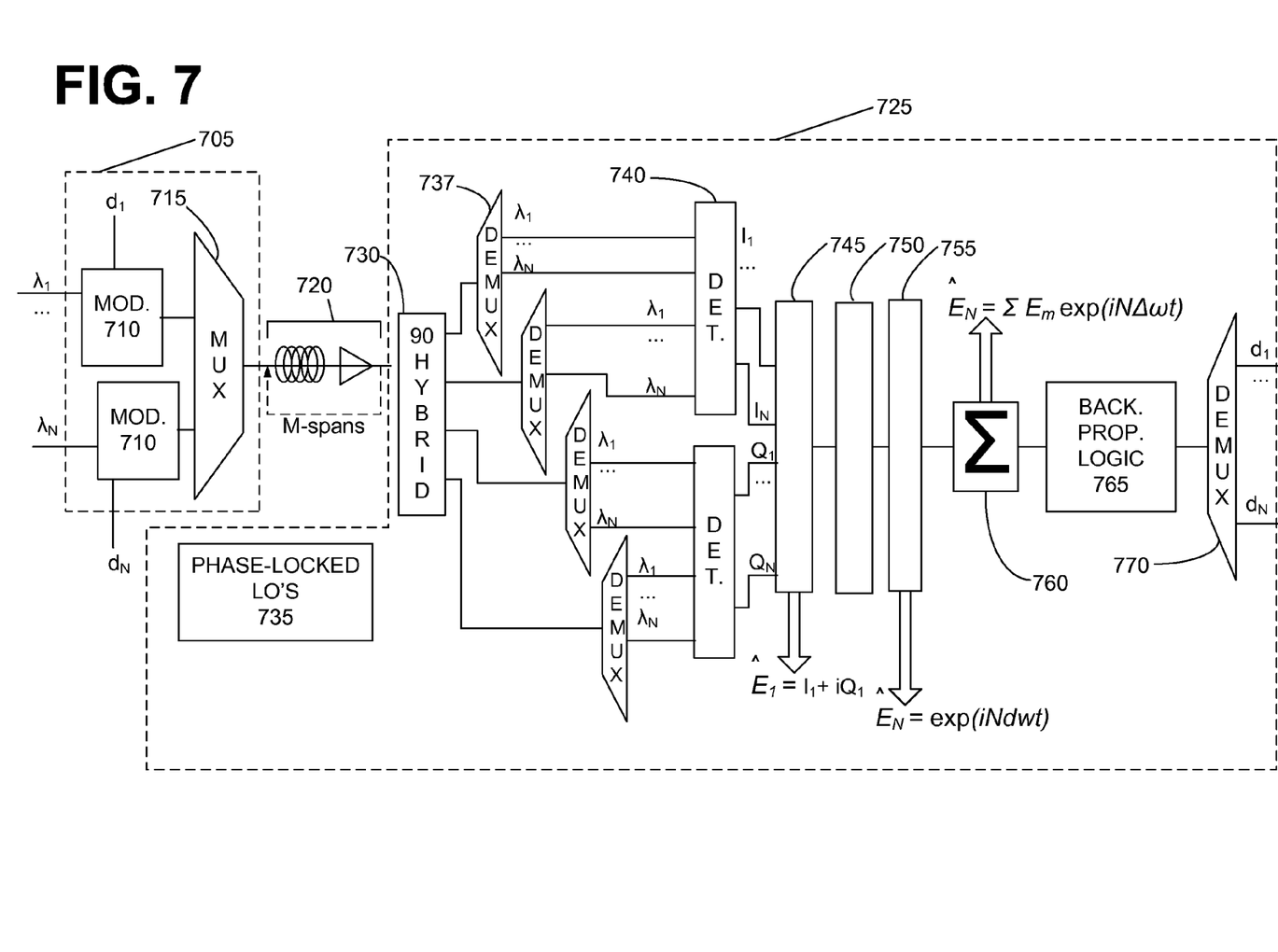
FIG. 7 is a block diagram of a wavelength division multiplexing (WDM) communication system utilizing an embodiment of impairment compensation logic which performs total compensation.

FIG. 7 is a block diagram of a wavelength division multiplexing (WDM) communication system utilizing an embodiment of impairment compensation logic 190 which performs total compensation. Post-compensation is performed in the digital domain after coherent detection. Transmitter 705 includes an optical modulator 710 which modulates optical signals $\lambda_1$ through $\lambda_N$ according to (electrical) data signals $d_1$ to $d_N$. Multiplexer 715 performs wavelength-division multiplexing on the modulated optical signals. The WDM signal is transmitted over M (amplified) optical fiber spans 720. It should be appreciated that various technologies and mechanisms can be used for amplification and modulation.

Receiver 725 mixes the signal in a 90° optical hybrid 730 with a set of phase-locked local oscillators 735. After demultiplexing (blocks 737), a set of balanced photo-detectors 740 obtains in-phase and quadrature components of each WDM channel. The I and Q components are provided to complex field reconstructor 745, which produces the complex form of the signal for each channel, $\hat{E}_1 \ldots \hat{E}_N (\hat{E}_j=I_j+iQ_j)$.

After upsampling (block 750), spectral reconstructor 755 produces the signals $E_1 \ldots E_n$ ($E_j \exp(im\Delta\omega t)$), which are supplied to summator 760. As described earlier in connection with FIG. 3, summator 760 combines the per-channel signals $E_1 \ldots E_n$, into a single $E_{in}$ input to backward propagation logic 765. Backward propagation logic 765 uses the techniques described above to model for total compensation. Finally, the compensated signal is demultiplexed (770) and the originally transmitted data is estimated.

Figure 8:
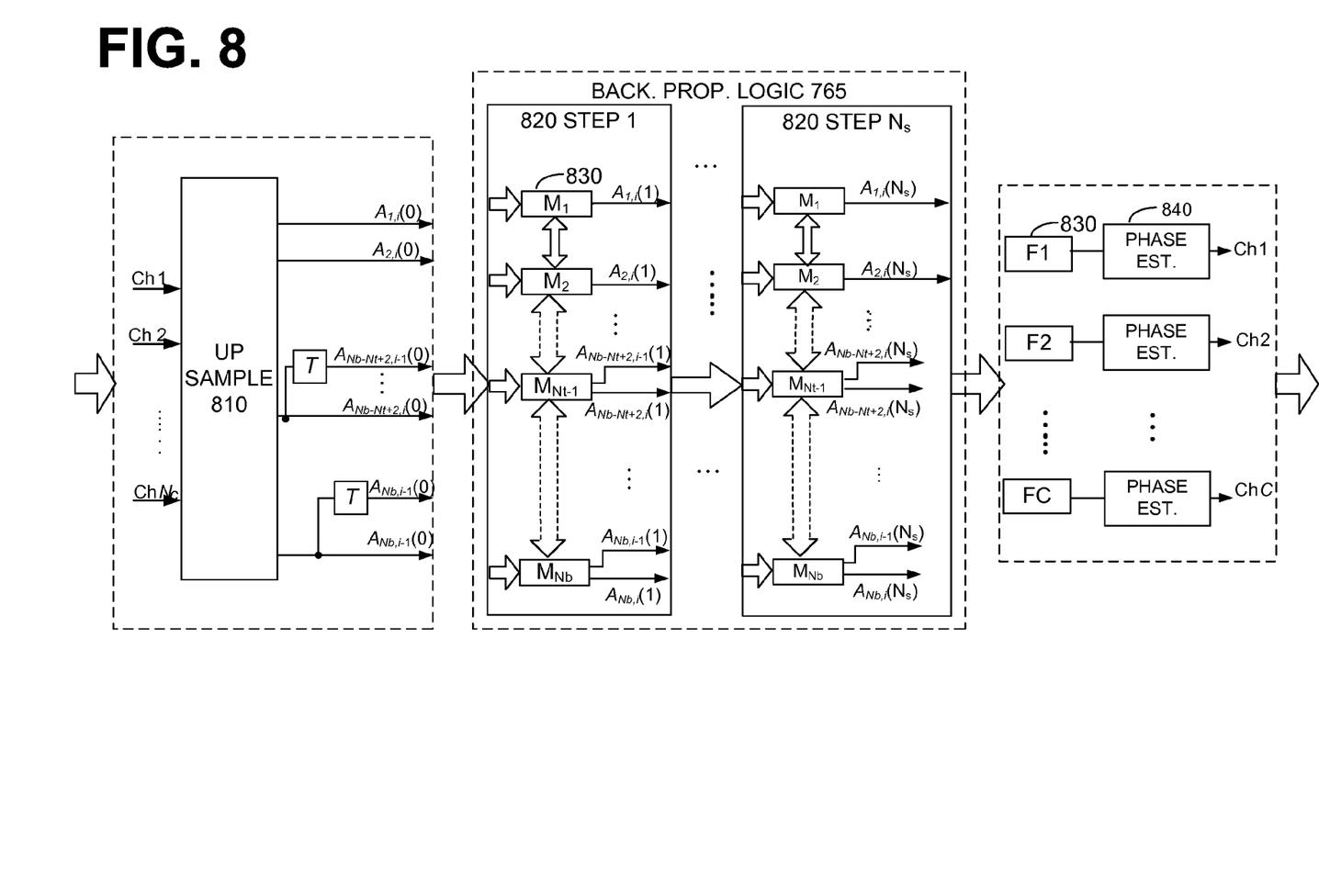
FIG. 8 is a block diagram of parallel implementation for one embodiment of backward propagation logic from FIG. 7, showing the feasibility of real-time operations.

FIG. 8 is a block diagram of parallel implementation for one embodiment of backward propagation logic 765, showing the feasibility of real-time operations. The total step number in the backward propagation is $N_s=L\times N$, while the processing rate of processor is $R_p$. In some embodiments, $R_p$ is the same as the symbol rate. In other embodiments, a time-division demultiplexing technique is used. Such embodiments trade off more processing units for a reduced processing rate.

After up-sampling (block 810), $N_b$ sampling points are generated in parallel and output simultaneously in $N_b$ branches. This sampling point generation occurs every period T, where $N_b=M\cdot F_s/R_p$ is the number of parallel processing branches, and $T=1/R_p$ is the clock cycle in each branch. Some branches use one-symbol delay latches to obtain additional outputs for the parallel implementation of the following dispersion operator. This number of additional outputs is $N_t-1$, where $N_t$ is the dispersion operator filter length or tap number (for the split-step FIR method case). $A_{k,i}$ is the kth sampling point in the ith symbol and is processed in the kth branch ($A_{k,i}$ represents the sampling points of the signal after module 760 in FIG. 7).

Sampled data from all the branches are then sent into backward propagation logic 765, which is composed of a number of cascaded modules (820) which perform the split-step FIR method. Each module 820 performs one step in the backward propagation, compensating loss, dispersion and nonlinearity of a small segment of fiber. The number of modules equals to the step number. Each step contains $N_b$ sub-units (830) to perform backward propagation for each branch respectively. $M_k$ is the sub-unit in the kth branch of each step. $A_{k,i}(n)$ is the output of the kth branch in the nth step and i is the symbol index.

Following the backward propagation, the per-channel outputs from backward propagation logic 765 are provided to respective filters (840) and phase estimator (850) units to recover the data. In some embodiments, the filter is a low-pass finite impulse response filter (FIR). In some embodiments, the signal in each channel is resampled to one sample per symbol before phase estimtation.

FIG. 9 is a block diagram of branch sub-unit 830. Note that FIG. 9 depicts the parallel implementation of the T-NLSE step module 410 when the split-step FIR method is used. The coefficients of the FIR filter used for dispersion compensation are designated by $a_i$, where i∈0 . . . N, −1. The inputs and outputs have been renamed as compared to FIG. 8, in order to simplify the diagram. Branch sub-unit 820 is designed according to the symmetric split-step scheme with two iterations when solving the T-NLSE (Eq. 1):

$$E(z+h, t) \approx \exp\left(\frac{h}{2}\hat{D}\right)\exp\left(\int_z^{z+h}\hat{N}(z')dz'\right)\exp\left(\frac{h}{2}\hat{D}\right)E(z, t) \quad \text{(Eq. 5)}$$

Where, $$\hat{N}^{-1} = i\gamma|E|^2, \quad \hat{D} = \frac{i\beta_2}{2}\frac{\partial^2}{\partial t^2} - \frac{\beta_3}{6}\frac{\partial^3}{\partial t^3} + \frac{\alpha}{2}$$

are the non-linear and linear operators respectively.

To improve the accuracy and thus increase the step size for the split-step FIR method, some embodiments use the trapezoidal rule to calculate the nonlinearity and approximate the integral by $$\int_{z}^{z+h} \hat{N}^{-1}(z')dz' \approx \frac{h}{2}[\hat{N}^{-1}(z) + \hat{N}^{-1}(z+h)] \quad \text{(Eq. 6)}$$

An iterative procedure is followed, one that is initiated by replacing $\hat{N}^{-1}(z+h)$ by $\hat{N}^{-}(z)$, then using Eq. 5 to estimate E(z+h,i) which in turn is used to calculate the new value of $\hat{N}^{-1}(z+h)$. The example embodiment of FIG. 9 uses three FIR filters for dispersion and loss compensation, and two inverse nonlinear operators for nonlinearity compensation in a sub-unit. The FIR filters are block 910, 920, and 930. The inverse nonlinear operator 1 (block 940) performs exp $\{h\hat{N}^{-1}(z)/2\}$ and the inverse nonlinear operator 2 (block 950) performs exp $\{h(\hat{N}^{-1}(z)+\hat{N}^{-1}(z+h))/2\}$. $Y_{k,i}$ is the output of the first stage and $Z_{k,i}$ is the output of the second stage.

The FIR filter is implemented in a parallel configuration, which has multiple inputs instead of one input combined with a series of delay latches (p·T is the delay of the FIR filter, and q·T is the delay of inverse non-linear operator 2 (block 950)). Therefore, each branch sub-unit operates at a speed of $R_p$ although the overall bandwidth is $N_b \cdot R_p$. Since the FIR filters use multiple inputs, all the branches interface with adjacent ones. This is represented in FIG. 9 by ports terminated with a circle. Similar to up-sampling module 810 in FIG. 8, each of the $N_r$–1 branch sub-units ranging from the $(N_b-N_r+2)$th to the $N_b$th has two outputs to the next step, while the remaining branch sub-units only have one output.

The additional outputs in branch sub-unit $N_r$–1 are used as the inputs of the FIR filters in the next step (performed by a different step module 810). Also, additional interfaces with adjacent branches are used in these $N_r$–1 sub-units. Additional outputs and modules required in some sub-units are indicated by the dashed lines in FIG. 9. Since each module processes only signals that are already available, the scheme can be carried out in real time.

Figure 10:
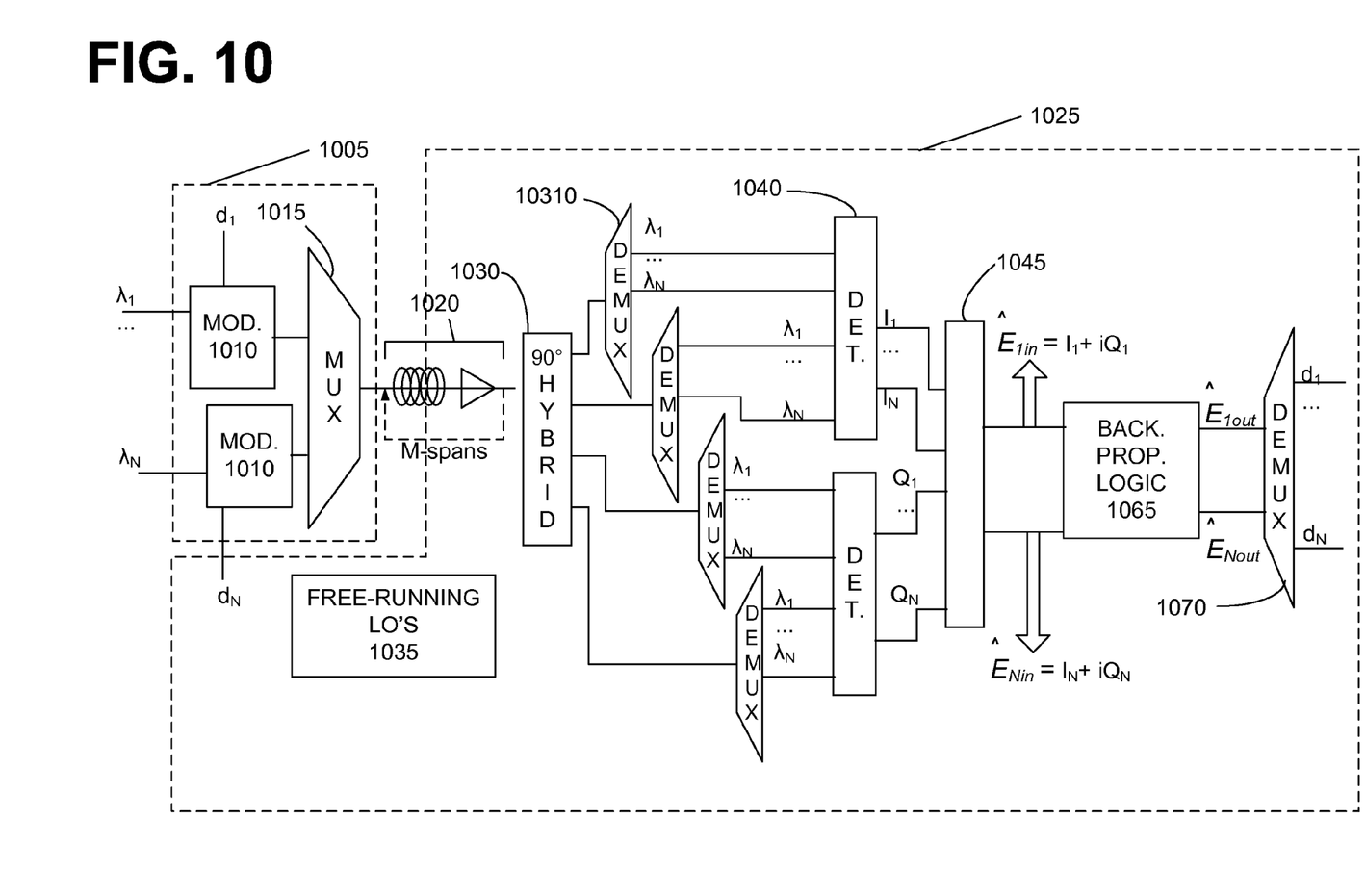
FIG. 10 is a block diagram of a wavelength division multiplexing (WDM) communication system utilizing an embodiment of impairment compensation logic which performs selective non-linear compensation to compensate for XPM but not FWM.

FIG. 10 is a block diagram of a wavelength division multiplexing (WDM) communication system utilizing an embodiment of impairment compensation logic 190 which performs selective non-linear compensation to compensate for XPM but not FWM. Post-compensation is performed in the digital domain after coherent detection. Transmitter 1005 includes optical modulators 1010 which modulate optical signals $\lambda_1$ through $\lambda_N$ according to (electrical) data signals $d_1$ to $d_N$. Multiplexer 1015 performs wavelength-division multiplexing on the modulated optical signals. The WDM signal is transmitted over M (amplified) optical fiber spans 1020. It should be appreciated that various technologies and mechanisms can be used for amplification and modulation.

Receiver 1025 mixes the signal in a 90° optical hybrid 1030 with a set of co-polarized free-running local oscillators 1035. Notably, phase locking on the LOs is not a requirement here since XPM is insensitive to the inter-channel relative phase. (This is in contrast to the total compensation WDM system of FIG. 7, which uses phase locked LOs in order to compensate for FWM, which is sensitive to inter-channel relative phase.) A set of balanced photo-detectors 1040 obtains in-phase and quadrature components of each WDM channel. The I and Q components are provided to complex field reconstructor 1045, which produces the complex form of the signal for each channel, $\hat{E}_1 \ldots \hat{E}_N(E_j=I_j+iQ_j)$. Backward propagation logic 1065 uses the techniques described above to model for total compensation, thus recovering the originally transmitted data.

Figure 11:
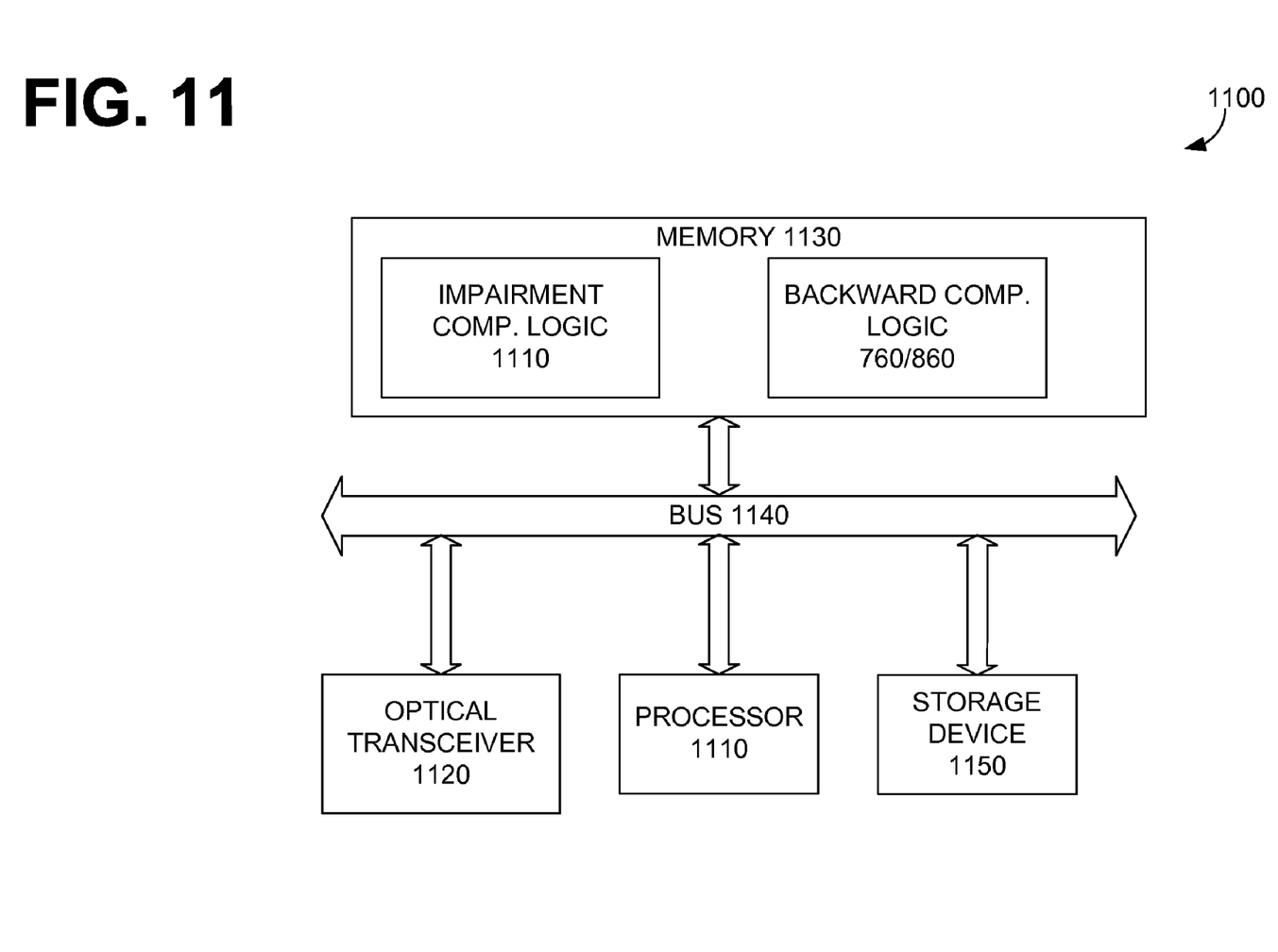
FIG. 11 is a hardware block diagram of a computing device which can be used to implement various embodiments of systems and methods of electronic wavefront correction for free-space optical communications.

FIG. 11 is a hardware block diagram of a computing device 1100 which can be used to implement various embodiments of systems and methods for electronic post-compensation of optical transmission impairments using digital backward propagation. Computing device 1100 contains a number of components that are well known in the computer arts, including a processor 1110 (e.g., microprocessor, digital signal processor, microcontroller, digital signal controller), an optical transceiver 1120, and memory 1130. These components are coupled via a bus 1140. Some embodiments also include a storage device 1150, such as non-volatile memory or a disk drive. In the embodiment of FIG. 11, impairment compensation logic 190 and backward propagation logic 765/1065 reside in memory 1130 as instructions which, when executed by processor 1110, implement systems and methods of fiber impairment compensation. Omitted from FIG. 11 are a number of conventional components that are unnecessary to explain the operation of computing device 1100.

In other embodiments (not shown), impairment compensation logic 190 and/or backward propagation logic 765/1065 is implemented in hardware, including, but not limited to, a programmable logic device (PLD), a programmable gate array (PGA), a field programmable gate array (FPGA), an application-specific integrated circuit (ASIC), a system on chip (SoC), and a system in package (SiP).

Impairment compensation logic 190, backward propagation logic 765/1065, or combinations thereof, can be embodied in any computer-readable medium for use by or in connection with an instruction execution system, apparatus, or device. Such instruction execution systems include any processor-containing system, or other system that can fetch and execute instructions. In the context of this disclosure, a "computer-readable medium" can be any means that can contain or store the instructions for use by the instruction execution system. The computer readable medium can be, for example but not limited to, a system or that is based on electronic, magnetic, optical, electromagnetic, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of compensating for transmission impairment, the method comprising:
   receiving an optical signal which has been distorted in a physical domain by an optical transmission channel; and
   propagating the distorted optical signal backward in an electronic domain in a corresponding virtual optical transmission channel.

2. The method of claim 1, wherein the optical signal is a wavelength-division multiplexed signal.

3. The method of claim 1, wherein the optical signal is a polarization-division multiplexed signal.

4. The method of claim 1, wherein the optical transmission channel includes an optical fiber and an optical amplifier, and the virtual optical transmission channel includes a virtual optical fiber, the method further comprising:
   modeling the virtual optical fiber according to a non-linear Schrödinger equation (NLSE) using dispersion, loss and nonlinearity parameters which are opposite in value to a plurality of corresponding parameters for the optical fiber, to account for dispersion, intra-channel, and at least some inter-channel impairments.

5. The method of claim 4, wherein the virtual optical transmission channel includes a virtual attenuator, the method further comprising:
   modeling the virtual attenuator with an attenuation parameter that balances the gain of the corresponding optical amplifier.

6. The method of claim 4, wherein the NLSE is a total NLSE (T-NLSE).

7. The method of claim 4, wherein the NLSE is a coupled NLSE (C-NLSE).

8. The method of claim 4, further comprising:
   solving the NLSE using a split-step Fourier method.

9. The method of claim 4, further comprising:
   solving the NLSE using a split-step infinite impulse response method.

10. The method of claim 4, wherein the optical system is an imaging system, wherein the optical system further comprises a transmitter, receiver and transmission channel, and the received optical signal contains a spatially varying image.

11. The method of claim 10, where the spatial image is static.

12. The method of claim 10, where the spatial image varies in time.

13. A receiver comprising:
    memory containing instructions stored thereon;
    a processor configured by the instructions;
    an optical detector configured to receive an optical signal which has been distorted in a physical domain by an optical transmission channel and further configured to provide a corresponding distorted electrical signal to the processor,
    wherein the processor is configured by the instructions to:
       propagate the distorted electrical signal backward in an electronic domain in a corresponding virtual optical transmission channel.

14. The receiver of claim 13, wherein the received optical signal is a wavelength-division multiplexed signal.

15. The receiver of claim 13, wherein the received optical signal is a polarization-division multiplexed signal.

16. The receiver of claim 13, wherein the optical transmission channel includes an optical fiber and an optical amplifier, and the virtual optical transmission channel includes a virtual optical fiber and a virtual attenuator, and wherein the processor is further configured to:
    model the virtual optical fiber according to a non-linear Schrödinger equation (NLSE) using dispersion, loss and nonlinearity parameters which are opposite in value to the corresponding optical fiber parameters, to account for dispersion, intra-channel, and at least some inter-channel impairments; and
    model the virtual attenuator with an attenuation parameter that balances the gain of the corresponding optical amplifier.

17. The receiver of claim 13, wherein the NLSE is a total NLSE (T-NLSE).

18. The receiver of claim 13, wherein the NLSE is a coupled NLSE (C-NLSE).

19. The receiver of claim 13, wherein the processor is further configured to:
    solve the NLSE using a split-step finite impulse response method.

20. The receiver of claim 13, wherein the processor is further configured to:
    solve the NLSE using a split-step finite impulse response method wherein each step is performed in parallel.

21. The receiver of claim 17, wherein the processor is further configured to:
    solve the NLSE using split step Fourier-transform method.

22. The receiver of claim 17, where the block processing is implemented using the overlap-and-add method.

23. The receiver of claim 17, where the block processing is implemented using the overlap-and-save method.

24. The receiver of claim 17, wherein the processor is further configured to:
    solve the NLSE using a split-step finite impulse response method.

25. The receiver of claim 17, wherein the processor is further configured to:
    solve the NLSE using a split-step finite impulse response method wherein each step is performed in parallel.

* * * * *